March 18, 1930.    P. J. HUBER    1,750,669
AUTO CASE CLAMP
Filed May 16, 1928
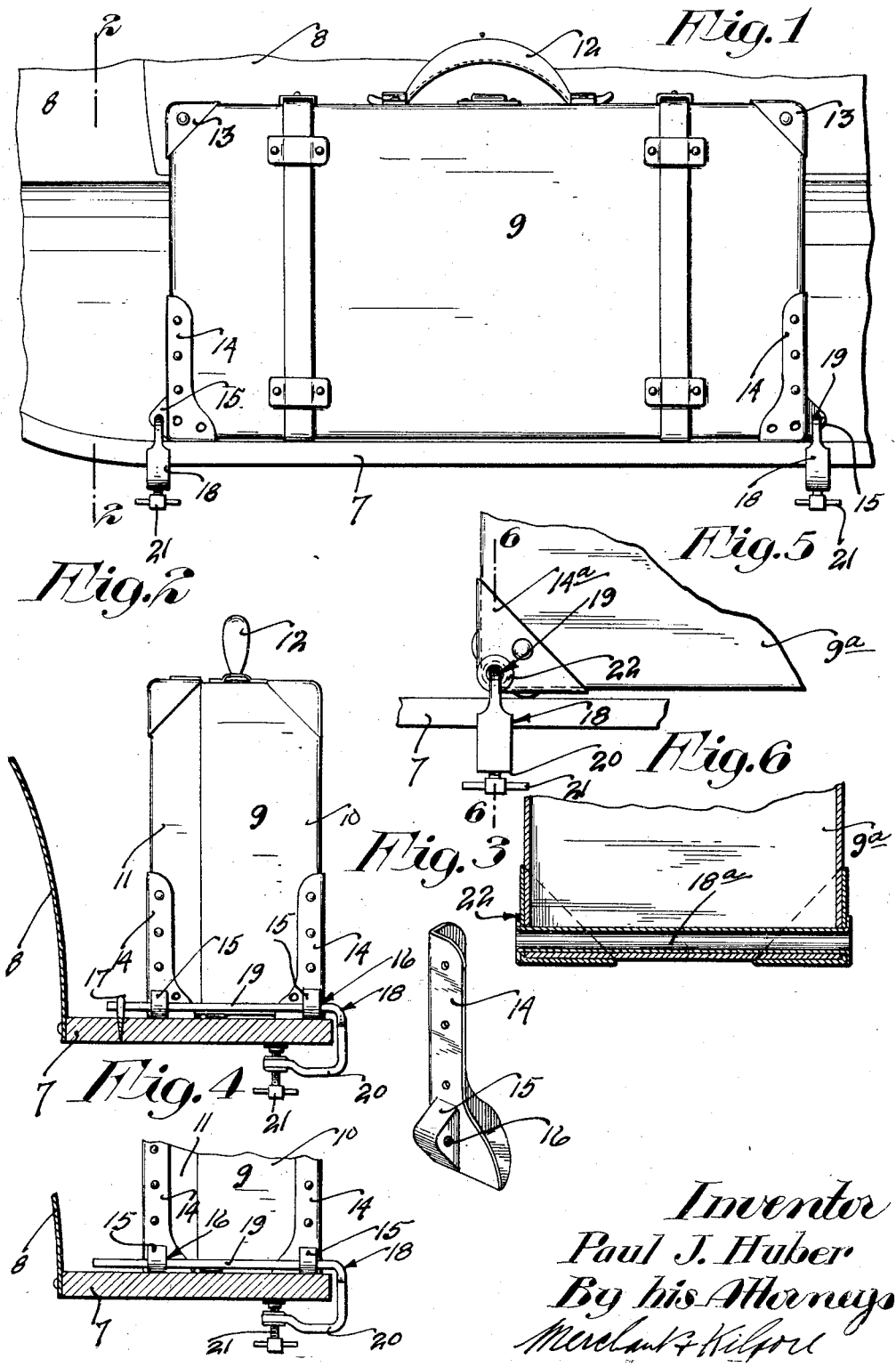
Inventor
Paul J. Huber
By his Attorneys
Merchant & Kilgore Patented Mar. 18, 1930

1,750,669

UNITED STATES PATENT OFFICE

PAUL J. HUBER, OF MINNEAPOLIS, MINNESOTA, ASSIGNOR OF ONE-THIRD TO FRANK W. PETERSON AND ONE-THIRD TO WILLIAM H. WALLRAFF, BOTH OF MINNEAPOLIS, MINNESOTA

AUTO CASE CLAMP

Application filed May 16, 1928. Serial No. 278,078.

My invention relates to clamping devices for securing suit cases, trunks, and the like, to automobile running boards, and has for its main object to provide extremely simple and highly efficient devices of the above described character.

In the accompanying drawings, which illustrate the invention, like characters indicate like parts throughout the several views.

Referring to the drawings:

Fig. 1 is a fragmentary side elevation of an automobile running board and body, showing a suit case secured to the running board by my clamping devices;

Fig. 2 is a section taken on the line 2—2 of Fig. 1;

Fig. 3 is a perspective view of one of the lower corner-reinforcing caps and lug secured thereto;

Fig. 4 is a fragmentary view similar to Fig. 2, but showing a slight modification;

Fig. 5 is a fragmentary view similar to Fig. 1, but showing a modified means connecting the clamping device proper to the case; and Fig. 6 is a section taken on the line 6—6 of Fig. 5.

Referring first to Figs. 1, 2 and 3, the numeral 7 indicates the running board of an automobile, and the numeral 8 a part of the automobile body. The numeral 9 indicates a suit case comprising hingedly connected sections 10 and 11, a handle 12, upper corner-reinforcing caps 13 and lower corner-reinforcing caps 14. Secured to each of the lower reinforcing caps 14 is a lug 15 that projects outward beyond the end of the case, and each of which lugs is provided with a hole 16 that aligns with the hole in the other lug on its end of the case.

Located near the inside of the running board 7 is a pair of screw eyes 17 that are spaced apart a distance equal to that of the holes 16 in the lugs 15 on opposite ends of the case, so that, when the case 9 is set in place, as shown in Figs. 1 and 2, the holes in each of the screw eyes 17 will align with the holes in the lugs on their respective ends of the case 9.

The clamping devices proper are in the form of U-shaped brackets 18 having long upper arms 19 that are insertable through the aligned holes 16 in the lugs 15 and through the eyes 17, one on each side of the case, and also having lower arms 20 that underlie the running board 7 and the case 9 and are equipped near their inner ends with screw-threaded clamps 21. With the clamping devices described, the case may be very readily attached to or detached from the running board of an automobile, and when the device is in place, as illustrated, it will be firmly held against upward, sidewise or swaying movements. By inserting the elongated inner end of the upper arms 19 of the bracket 18 through the screw eyes in the running board 7 inside of the case 9, said arm 19 is firmly held in position in respect to the running board and will not be allowed to rise upward on its inner end by outward pressure on the top of the case. Suit cases are not very wide and are sometimes quite high and, hence, when loaded, have much more tendency to tip or sway than do cases or trunks that are low and wide. When it is desired to detach the case from the running board, the screw clamp 21 is loosened and the brackets 18 may be pulled laterally outward and conveniently placed within the vehicle, leaving only the small lugs on the case itself.

Standard forms of suit cases found on the market are usually provided at all four corners with light metal reinforcing caps similar to the upper reinforcing caps 13 here shown. The bottom reinforcing caps of the applicant's device, however, are elongated at their upper portion so as to enable said caps to be more securely fastened to the case 9 by rivets or the like than is possible with the small caps 13.

The lugs 15, or devices of like character, may be secured to the bottom corner-reinforcing caps that are standard on ordinary suit cases, but it is preferred that caps of the character shown be used either to replace the ordinary caps or that they be applied over the same, in which latter case, the original caps would be completely covered.

As has already been indicated, the screw eyes 17 are not essential in all cases and, therefore, I have shown a modification of the device in Fig. 4, which illustrates exactly the same devices as Figs. 1 and 2, except that said screw eyes have been omitted. Figs. 5 and 6 illustrate a modified method of detachably securing the upper arm 19 of the U-shaped bracket 18 to a case 9ª. As illustrated in said Figs. 5 and 6, a case 9ª is provided with lower reinforcing caps 14ª. The lower reinforcing caps 14ª, on opposite sides and on the same end of the case 9ª, are connected though said case 9ª by tubes 18ª, which tubes are flanged at their ends and which flanges overlie the outside surfaces of the connected reinforcing caps 14ª and thus hold said tubes firmly against endwise sliding movements. The upper arms 19 of the clamping brackets 18 are insertable through the tubes 18ª.

This last noted method of providing the case with means for receiving the upper arms 19 of the brackets 18 is very practical for use with cases or trunks that open near their upper portions, but it does not adapt itself for use with suit cases of the type illustrated in Figs. 1, 2 and 3, as the tubes 18ª would prevent the sections of the case from opening. The flanges 22 of the tubes 18 may be soldered or otherwise secured to the corner caps 14ª so as to guarantee a water and dust-proof connection to the interior of the case.

It is very important to note that the clamping device illustrated in Figs. 1, 2, 3 and 4 prevents any possibility of the suit case accidentally opening while secured to the running board. The case sections are hingedly connected at 23 and, therefore, in order to open this type of case, it would be essential to remove the upper arm 19 of the U-shaped bracket 18 from the holes 16 in the lugs 15. The case illustrated is shown as provided with straps, but such straps are not used on all cases. Hence, this safety feature is of the utmost importance.

What I claim is:

1. In combination with a case provided at its bottom with corner-reinforcing caps, a lug on each of said caps, a hole in each of said lugs, aligned with the hole in the other lug on its end of the case, U-shaped brackets each comprising a relatively long upper arm insertable through the aligned holes in the lugs on one side of the case, a relatively short lower arm, and a clamping device near the inner end of said lower arm and capable of engaging the under side of a suitable base of support upon which said case is to be secured.

2. The combination with a case having corner-reinforcing caps covering its bottom corners, of lugs on said caps, a hole in each lug aligned with the hole in the other lug on its end of the case, a base of support for said case, eyes on said base, one on each side of the case and each being laterally and horizontally aligned with the holes in the lugs on its end of the case, U-shaped brackets each comprising a relatively long upper arm, a relatively short lower arm, and a clamping device near the inner end of said lower arm, the long upper arm of each bracket being insertable through the aligned holes in the lugs on one side of the case and through the aligned eye on the base of support.

3. In combination with a case provided at its bottom corners with reinforcing caps, an eye on each of said caps that is aligned with the eye on the other cap on its end of the case, U-shaped brackets each comprising a relatively long upper arm insertable through the aligned eyes in the caps on one side of the case, a lower arm and a clamping device near the inner end of said lower arm that is capable of engaging the under side of a suitable base of support upon which said case is secured.

In testimony whereof I affix my signature.

PAUL J. HUBER.